United States Patent [19]
Kawamura

[11] Patent Number: 5,820,833
[45] Date of Patent: Oct. 13, 1998

[54] EXHAUST GAS PURIFIER

[75] Inventor: Hideo Kawamura, Samukawa-machi, Japan

[73] Assignee: Isuzu Ceramics Institute Co., Ltd., Kanagawa-ken, Japan

[21] Appl. No.: 788,912

[22] Filed: Jan. 22, 1997

[30] Foreign Application Priority Data

Feb. 9, 1996 [JP] Japan ................................ 8-046957

[51] Int. Cl.$^6$ .............................. F01N 3/10; B01D 29/62
[52] U.S. Cl. .................... 422/174; 422/171; 422/177; 422/178; 55/301; 55/282; 55/523; 55/DIG. 10; 55/DIG. 30; 60/295; 60/311
[58] Field of Search .................... 422/174, 171, 422/177, 178; 55/523, 282, 301, 524, DIG. 10, DIG. 30; 60/299–300, 311, 295

[56] References Cited

U.S. PATENT DOCUMENTS

| | | | |
|---|---|---|---|
| 5,224,973 | 7/1993 | Hoppenstedt et al. | ............. 55/DIG. 30 |
| 5,571,298 | 11/1996 | Buck | ................................ 55/DIG. 30 |

FOREIGN PATENT DOCUMENTS

| | | |
|---|---|---|
| 0270990 | 6/1988 | European Pat. Off. . |
| 4305915 | 11/1994 | Germany . |
| 94/108820 | 4/1994 | Japan . |
| 9402720 | 2/1994 | WIPO . |

OTHER PUBLICATIONS

Patent Abstracts of Japan, JP 06 170224, Jun. 21, 1994.
Patent Abstracts of Japan, JP 06 246158, Sep. 6, 1994.

*Primary Examiner*—Hien Tran
*Attorney, Agent, or Firm*—Browdy and Neimark

[57] ABSTRACT

The present invention provides an exhaust gas purifier for collecting particulates with fiber filters while reducing $NO_x$ by the action of granulated materials disposed on the outer sides of the fiber filters and having an $NO_x$-reducing action. In this exhaust gas purifier, the fiber filters for collecting particulates contained in exhaust gas are constituted of a randomly laminated nonwoven fabric, and electric wire nets are disposed on the inner sides of the fiber filters. The granulated materials made of $Ba_3Y_4O_9$, $BaLa_2O_4$ or $Ba_2In_2O_5$ having an $NO_x$-reducing action are filled in a large numbers of cells of porous members disposed on the downstream sides of the fiber filters.

7 Claims, 2 Drawing Sheets

EXHAUST GAS PURIFIER

BACKGROUND OF THE INVENTION

1. Field of the Invention

The present invention relates to an exhaust gas purifier applicable to a cogeneration system or the like for purifying diesel engine exhaust gas by collecting particulates contained therein and reducing $NO_x$ also contained therein.

2. Description of the Prior Art

A large amount of nitrogen oxides ($NO_x$) is discharged from a diesel engine. There have heretofore been known diesel particulate filters having a variety of respective catalysts incorporated thereinto in order to suppress outward discharge of nitrogen oxides from diesel engines. For example, there has been known a diesel particulate filter having a zeolite catalyst (e.g. Cu-ZSM-5) incorporated thereinto. On the other hand, in a structure wherein a catalyst unit is incorporated into a diesel particulate filter, a method of passing exhaust gas through the openings of the diesel particulate filter is adopted like in a general-purpose gasoline engine.

Known usable examples of the material of an exhaust gas treatment filter for collecting particulates, i.e., particulate substances such as carbon, soot and HC from diesel engine exhaust gas include cordierite ($Mg_2Al_4Si_5O_{18}$) and inorganic fibers. A filter body made using an inorganic fiber is formed by twisting an inorganic fiber material into a twist yarn, laminating the twist yarn into a cop form, weaving an inorganic fiber material diamond-wise into the resulting laminate to effect felting thereof. The filter body made of the inorganic fiber material can be miniaturized as compared with a honeycomb filter made of cordierite because the former enables particulates such as carbon and smoke in exhaust gas discharged from a diesel engine to be trapped in the inner part of the filter body as well as on the surface thereof.

On the other hand, Japanese Patent Laid-Open No. 108,820/1994 discloses a heat-resistant filter. This heat-resistant filter is such that a filtering layer formed of a randomly integrated heat-resistant fiber is provided between gas-permeable partitions, of which at least a partition disposed on the downstream side in the direction of passage of a fluid to be filtered is formed of a facing entwined fabric made of a heat-resistant fiber.

However, in the diesel particulate filter having a zeolite catalyst incorporated thereinto, although the zeolite catalyst has a feature that it makes use of hydrocarbons as a reducing agent to reduce and decompose $NO_x$, methanol or ethanol becomes necessary as a reducing agent for hydrocarbons in the diesel particulate filter wherein the zeolite catalyst is used. Thus, this method cannot be used in a diesel engine. On the other hand, the diesel particulate filter apparatus having a catalyst unit incorporated thereinto involves a fear that, when graphite or particulates are deposited on the wall surfaces of the unit around the openings thereof and then come in contact with $NO_x$, HC hardly works as a reducing agent.

Meanwhile, compounds having a brownmillerite structure are known as compounds capable of exhibiting order-disorder transition of oxygen defects. These compounds have a property that they undergo transition at a given temperature at which the crystal phase thereof undergoes phase transition from a rhombic crystal phase to a perovskite type cubic crystal phase. These compounds are remarkably improved in ionic conduction due to oxygen defects disordered in keeping with this phase transition. This ionic conduction is capable of reducing and decomposing $NO_x$. Specifically, the following reaction occurs. $Vo^x + NO \rightarrow (\frac{1}{2}) N_2 + (\frac{1}{2}) O_2 + Vo^y$, wherein $Vo^x$ is an ionized oxygen defect, and $Vo^y$ is an order factor.

SUMMARY OF THE INVENTION

An object of the present invention is to solve the foregoing problems, i.e., to provide an exhaust gas purifier wherein particulates contained in diesel engine exhaust gas are collected and incinerated with filter bodies comprising filter members and electric wire nets and disposed on the upstream side of an exhaust gas flow, while reducing $NO_x$ contained in exhaust gas by colliding exhaust gas against granulated materials of a compound(s) chosen in accordance with the temperature of exhaust gas and filled in cells of porous members disposed downstream of the filter bodies and having a large number of cells which may comprise upstream cells filled with a brownmillerite structure compound having a high transition temperature and downstream cells filled with a brownmillerite structure compound having a low transition temperature, whereby the amounts of particulates and $NO_x$ in exhaust gas are decreased.

The present invention is directed to an exhaust gas purifier comprising filter members for collecting particulates contained in diesel engine exhaust gas; electric wire nets integrated with and disposed downstream of the filter members in the direction of an exhaust gas flow; porous members disposed downstream of the composite members of the filter members with the electric wire nets, made of a ceramic, and having a large number of cells; and granulated materials made of a compound(s) filled in the cells of the porous members and having a brownmillerite structure having an $NO_x$-reducing action.

The granulated materials may be made of a compound(s) selected from the group consisting of $Ba_3Y_4O_9$, $BaLa_2O_4$ and $Ba_2In_2O_5$ capable of exhibiting order-disorder transition of oxygen defects.

The filter members may each be constituted of a fiber filter made of a randomly laminated ceramic nonwoven fabric.

The porous members may be constituted of a ceramic selected from the group consisting of SiC, $Si_3N_4$, cordierite ($Mg_2Al_4Si_5O_{13}$) and mullite ($Al_6Si_2O_3$).

In the granulated materials, a compound having a high transition temperature may be disposed on the upstream side of the exhaust gas flow, while a compound having a low transition temperature may be disposed on the downstream side of the exhaust gas flow. In this exhaust gas purifier, therefore, the brownmillerite structure compound having a high transition temperature reaches the transition temperature to be activated for effective reduction of $NO_x$ since the exhaust gas temperature is as high as, for example, about 800° C. on the upstream side of the exhaust gas flow When the exhaust gas temperature is then lowered on the downstream side of the exhaust gas flow, the brownmillerite structure compound having a low transition temperature can still reach the transition temperature to be activated for effective reduction of $NO_x$. Thus, $NO_x$ can be effectively reduced over a wide temperature range by the action of the above-mentioned compounds to decrease the discharge of $NO_x$. Furthermore, since the granulated materials of the above-mentioned compounds may be constituted of particles of various sizes, the contact area thereof with exhaust gas can be increased in keeping with a lowering flow speed of exhaust gas to promote the reduction of $NO_x$ in exhaust gas by the effective action thereon of the granulated materials.

The filter members may be constituted of hollow bodies. The electric wire nets may be disposed on the inner sides of the hollow bodies, on the outer sides of which the porous members may be disposed. Exhaust gas is flowed from the inner sides of the filter members to the outer sides thereof. The outer shapes of the filter members may be formed such that the cross sections thereof are in a cylindrical or square form, while the shapes of the porous members are formed such that the cross section thereof are in a cylindrical or square form corresponding to the outer shapes of the hollow bodies.

Particulates collected with the filter members are heated and incinerated by flowing electricity through the electric wire nets.

When exhaust gas from which particulates have been collected with the filter members comes in contact with the granulated materials during its passage through the granulated materials, $NO_x$ is reduced. Thus, exhaust gas arriving at the granulated materials is so substantially free of particulates such as carbon, soot and HC that $NO_x$ in exhaust gas can be effectively brought into contact with the granulated materials to promote the reduction action of $NO_x$.

Since the exhaust gas purifier of the present invention has the foregoing constitution, particulates contained in exhaust gas are first collected with the filter bodies and then $NO_x$ contained in exhaust gas is reduced through contact with the granulated materials made of the compound(s) having a brownmillerite structure, thus purifying exhaust gas in two stages. Specifically, when high-temperature exhaust gas flows zigzag through the interfiber openings of the laminate portions of the filter bodies, particulates in the form of aggregates of fine particles contained in exhaust gas are collected with the filter bodies to deposit between fibers and between wires of the wire nets. When exhaust gas containing $NO_x$ then collides against the granulated materials during its passage across the walls of the porous members, $NO_x$ reacts with ions based on oxygen defects of the granulated materials to be reduced. Thus, the reduction reaction of $NO_x$ quickly occurs by the catalytic action of the granulated materials if exhaust gas containing $NO_x$ has a given speed of collision against the granulated materials. The granulated materials may be made of $Ba_3Y_4O_9$, $BaLa_2O_4$ or $Ba_2In_2O_5$ having a brownmillerite structure. Since the granulated materials are large in surface area as a whole, they can bring about quick reduction of $NO_x$.

In this exhaust gas purifier, since the granulated materials are such that $Ba_2In_2O_5$ or the like as the compound having a high transition temperature is disposed on the upstream side of the exhaust gas flow while $Ba_3Y_4O_9$ and/or $BaLa_2O_4$ as the compound having a low transition temperature is disposed on the downstream side of the exhaust gas flow, provided that both may be disposed either in series or in the form of a two-layer material with the latter on the most downstream side of the exhaust gas flow, $NO_x$ contained in exhaust gas can be reduced by the action of $Ba_2In_2O$, high in transition temperature at a high exhaust gas temperature, next by the action of $Ba_3Y_4O_9$ low in transition temperature at a low exhaust gas temperature, and next by the action of $BaLa_2O_4$. Thus, $NO_x$ in exhaust gas can be reduced over a wide range of exhaust gas temperature to decrease the amount of $NO_x$ in exhaust gas.

When particulates in an amount of at least a predetermined value are collected with the filter bodies, electricity is flowed through the electric wire nets disposed on the inner sides of the fiber filters to heat and incinerate the particulates collected with the fiber filters, thereby regenerating the fiber filters. In this exhaust gas purifier, the amount of $NO_x$ in exhaust gas is decreased through the reduction reaction of $NO_x$ contained in exhaust gas by the action of the granulated materials, while the amount of particulates contained in exhaust gas is decreased through collection thereof with the filter bodies.

Since this exhaust gas purifier has the foregoing constitution, reduction of $NO_x$ can be efficiently effected in the case where it is formed to be large-sized. Thus, the purifier is most suitably used for incorporation thereof into the exhaust pipe of a built-in type or the like large-sized engine applicable to a cogeneration system. In this case, since $NO_x$ can be reduced to a level of, for example, at most 40 ppm, $NO_x$ causative of pollution with exhaust gas can be effectively decomposed even if a cogeneration system is used in an urban area.

Since this exhaust gas purifier has the electric wire nets disposed on one sides of the filter members and the porous ceramic members disposed on the other sides of the filter members and having a large number of cells which are particularly filled with the granulated materials made of the compound(s) having a brownmillerite structure having a $NO_x$-reducing action, $NO_x$ contained in exhaust gas is decomposed through the reduction action thereof by the action of the granulated materials to be converted into $N_2$ and $O_2$, whereby the amount of $NO_x$ in exhaust gas can be decreased. When exhaust gas passes across the fiber filters constituting the filter members, particulates contained in exhaust gas are collected with the fiber filters. When particulates in an amount of at least a predetermined value are collected with the fiber filters, the particulates can be heated and incinerated by flowing electricity through the electric wire nets disposed on the inner sides of the fiber filters.

Even if collection of particulates with the filter bodies and subsequent heating and incineration of the particulates for regeneration of the filter bodies are repeated, the fiber filters can be prevented from being separated and scattered, the fiber filters and the electric wire nets are neither separated from each other nor deformed, the fiber filters are not abnormally overheated locally during heating and incineration of the particulates, and the filter bodies can play the role of silencers as well to decrease the crashing sound of exhaust pressure waves, because the fiber filters have the wire nets disposed on the inner sides thereof and covered with the porous members on the outer sides thereof.

DETAILED DESCRIPTION OF THE EMBODIMENTS

Figure 1:
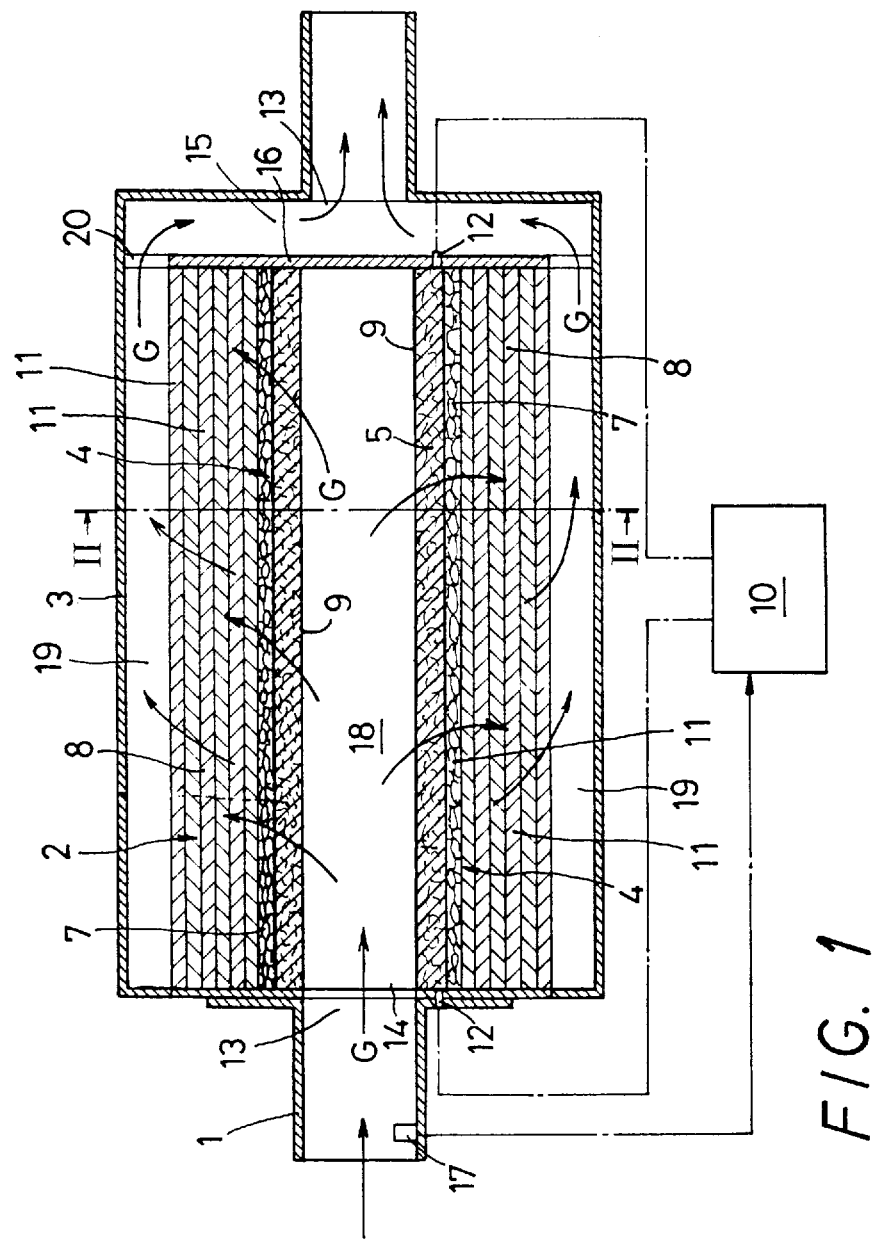
FIG. 1 is a schematic cross-sectional view of an example of the exhaust gas purifier of the present invention.

An example of the exhaust gas purifier of the present invention will now be described while referring to the accompanying drawings. The exhaust gas purifier of this example, which is preferably used in a built-in type cogeneration system, is constructed to be contained, for example, in a case 3 incorporated into the exhaust pipe 1 of a diesel engine. When exhaust gas discharged from the diesel engine flows across a filter body 4 in directions indicated by the arrows G, particulates such as carbon, smoke, soot, HC and SO$_x$ contained in exhaust gas are collected with the filter body 4. The collected particulates are heated and incinerated to regenerate the filter body 4. NO$_x$ in exhaust gas is reduced by the action of granulated materials 7, 8 made of compounds having a brownmillerite structure having an NO$_x$-reducing action, which are filled in a large number of cells 11 of a porous member 2 disposed on the downstream side of the filter body 4, whereby the discharge of NO$_x$ is decreased.

Figure 2:
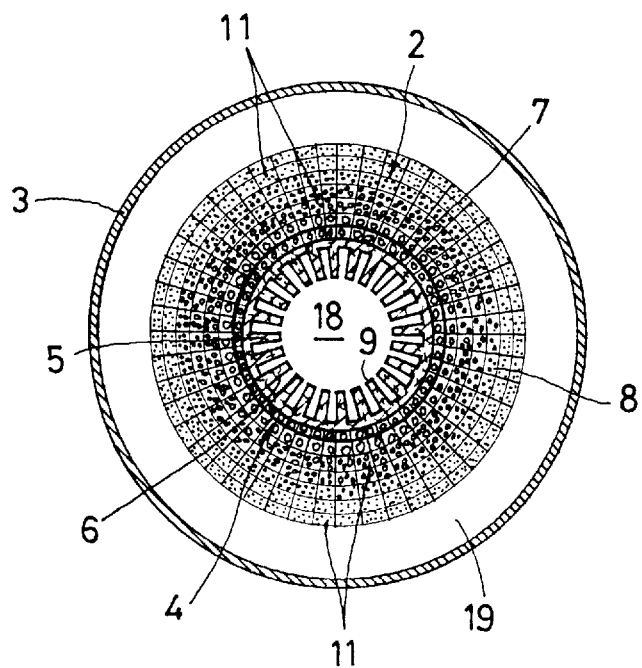
FIG. 2 is a cross-sectional view of this exhaust gas purifier, taken along the line II—II of FIG. 1.

The filter body 4, which is constituted of a hollow fiber filter 5 provided with recesses 6 on the inner side thereof and an electric wire net 9 formed in the recesses 6 in close contact with the inner side of the fiber filter 5 as shown in FIG. 2, is disposed extending from an inlet 14 to an outlet 15 in an exhaust gas path 13,19 in the case 3. A hollow portion 18 is open at an inlet guide roller for the filter body 4 and is closed with a shield plate 16 on the side of the outlet. A heat shield, though not shown in the figures, may be disposed on the inner wall surface of the case 3 to prevent heat from being dissipated outward. The filter body 4 is fixed to the case 3 by means of a fastener 20 such as a clasp or a support bar.

The fiber filter 5, which is constituted of long fibers of an Si$_3$N$_4$ fiber material, an SiC fiber material or an SiC-Ti-O fiber material (Si-C-O, Si-Ti-C-O, Si-C), is formed by laminating the long fibers at random into a felty form. The fiber filter 5 is disposed on the outer peripheral side (on the downstream side of an exhaust gas flow) of the electric wire net 9. The fiber diameter of the ceramic fiber 5 is, for example, about 5 to 15 $\mu$m, while the length thereof is, for example, about 30 to 150 mm. On the other hand, the electric wire net 9 disposed in close contact with the fiber filter 5 on the inner side thereof is formed in such a way as to have such a wire mesh structure formed of heat-resistant Ni or a heat-resistant Cr—Fe alloy that the filter body 4 can be uniformly heated therewith.

The regeneration of the filter body 4 can be attained by flowing electricity through the electric wire net 9 to heat the filter body 4 to thereby heat and incinerate particulates collected with the filter body 4 in the same manner as in the case of conventional filter bodies. Since the electric wire net 9 is disposed in close contact with the fiber filter 5, the amount of heat conduction is small when the temperature is elevated by flowing electricity through the wire net, whereby the temperature can be elevated in a short time to decrease the electric power consumption of the wire net. Although the filter body 4 is constructed in a corrugated form having recesses along the inner circumference thereof in FIG. 2, it may be constructed in the form of a tube such as a cylinder or a square tube, a flat plate, a wavy profile, or the like.

The porous member 2 disposed on the outer side of the fiber filter 5 is made of a ceramic selected from the group consisting SiC, Si$_3$N$_4$ and mullite. The porous member 2 is extending in a longitudinal direction while having a large number of cells 11 disposed apart from each other in radial directions as shown in FIG. 2. The shape of the porous member 2 is formed into a cylindrical form corresponding to the outer shape of the fiber filter 5.

The cells 11 of the porous member 2 are filled with the granulated materials 7, 8 made of compounds having a brownmillerite structure (general formula: A$_2$B$_2$O$_5$) having an NO$_x$-reducing action. The granulated materials 7, 8 are made of compounds having a brownmillerite structure capable of exhibiting order-disorder transition of oxygen defects at a transition point (temperature), provided that A and B in the general formula stand for respective elements such as Ba, In, Y or La. These compounds, which undergo crystal phase transition from a rhombic crystal phase to a perovskite type cubic crystal phase at a transition temperature as a border, are remarkably improved in ionic conduction due to oxygen defects disordered in keeping with this phase transition. NO in NO$_x$ is decomposed into N$_2$ and O$_2$ by virtue of this ionic conduction. In this example, the granulated materials 7, 8 are made of respective compounds selected from the group consisting of Ba$_3$Y$_4$O$_9$, BaLa$_2$O$_4$ and Ba$_2$In$_2$O$_5$. These compounds are different from one another in transition temperature. For example, the transition temperature of Ba$_2$In$_2$O$_5$ is 800° C., the transition temperature of Ba$_3$Y$_4$O$_9$ is 500° C., and the transition temperature of BaLa$_2$O$_4$ is 450° C.

In this exhaust gas purifier, the granulated material 7 of a large particle size and of a compound Ba$_2$In$_2$O$_5$ having a high transition temperature is disposed in cells 11 of the porous member 2 on the upstream side of the exhaust gas flow, while the granulated material 8 of a small particle size and of a compound Ba$_3$Y$_4$O$_9$ and/or BaLa$_2$O$_4$ having a low transition temperature is disposed in cells 11 of the porous member 2 on the downstream side of the exhaust gas flow. The pressure of exhaust gas is detected with a pressure sensor 17 installed on a site close to the inlet of the filter body 4 in the exhaust pipe 1 to detect the amount of particulates collected with the filter body 4. When the amount of the collected particulates is found in this manner to be at least a predetermined value, the particulates collected with the filter body 4 are heated and incinerated while controlling the flow of electricity through the electric wire net 9 by order of a controller 10 to regenerate the filter body 4.

This exhaust gas purifier having the foregoing constitution works in the following manner. When the diesel engine is driven, exhaust gas is sent into the exhaust gas path 13 via the exhaust pipe. Exhaust gas is sent from the inlet 14 into the exhaust gas path 13, then passes from the exhaust gas path 13 across the filter body 4 to collect particulates such as soot, carbon, smoke, HC and SO$_x$ contained in exhaust gas with the filter body 4, and subsequently collides against and comes into contact with the granulated materials 7, 8 filled in the cells 11 of the porous member 2 to reduce NO$_x$ in exhaust gas, while the resulting clean exhaust gas is discharged from the exhaust gas path 19 toward the outlet 15. The collected particulates are deposited on the filter body 4. The pressure sensor 17 is provided in such a way that information on the pressure of exhaust gas or the amount of collected particulates, detected by the sensor 17, is inputted to the controller 10.

The controller 10 is constructed in such a way that it receives detection signals of the operating conditions of the engine, such as the load on the engine and the number of revolutions of the engine, and controls the flow of electricity through the electric wire net 9 in accordance with a predetermined detection value of the pressure of exhaust gas or the amount of collected particulates corresponding to the operating conditions of the engine to control the timing of regeneration of the filter body 4. More specifically, the controller 10 receives detection signals from various sensors such as the pressure sensor 17, judges the operating conditions of the engine from the detected values thereof, and flows electricity through the electric wire net 9 via electrode terminals 12 by order of the controller 10 to heat the electric wire net 9 to thereby heat the filter body 4 when the amount of collected particulates reaches a predetermined value, whereby the collected particulates can be heated and incinerated. In other words, particulates are heated and combusted using a slight amount of air contained in exhaust gas being passed across the filter body 4 by making the most of the principle of an excessive proportion of air in a diesel engine, whereby the particulates can be incinerated and gasified through conversion thereof into $CO_2$ and $H_2O$, which are discharged from the outlet 15.

Figure 3:
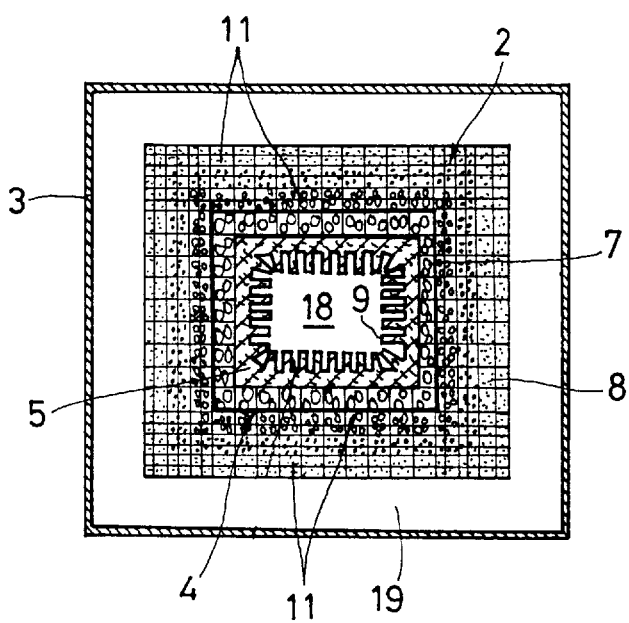
FIG. 3 is a schematic cross-sectional view of another example of the exhaust gas purifier of the present invention.

Another example of the exhaust gas purifier of the present invention will now be described while referring to FIG. 3. This example has the same constitution and function as the foregoing example except for a difference therebetween in shape. In this example, the outer shape of the hollow body of a fiber filter 5 is formed such that the cross section thereof is in a square from such as a quadrilateral form in FIG. 3, while shape of a porous member 2 is formed such that the cross section thereof is in a square form corresponding to the outer shape of the hollow body. Since the function of the exhaust gas purifier of this example is the same as in the foregoing example, the description thereof is omitted.

What is claimed is:

1. An exhaust gas purifier comprising filter members for collecting particulates contained in exhaust gas discharged from a diesel engine; electric wire nets disposed upstream of said filter members in the direction of an exhaust gas flow; porous members disposed downstream of said filter members, made of a ceramic, and having a plurality of cells; and granulated materials made of a compound filled in said cells of said porous members and having a brownmillerite structure having an $NO_x$-reducing action.

2. An exhaust gas purifier as claimed in claim 1, wherein said granulated materials are made of a compound selected from the group consisting of $Ba_3Y_4O_9$, $BaLa_2O_4$ and $Ba_2In_2O_5$ capable of exhibiting order-disorder transition of oxygen defects.

3. An exhaust gas purifier as claimed in claim 1, wherein said filter members are each constituted of a fiber filter made of a randomly laminated ceramic nonwoven fabric.

4. An exhaust gas purifier as claimed in claim 1, wherein said porous members are made of a ceramic selected from the group consisting of SiC, $Si_3N_4$, cordierite, and mullite.

5. An exhaust gas purifier as claimed in claim 2, wherein the granulated materials of the $Ba_2In_2O_5$ having a transition temperature are disposed in cells of said porous members on the upstream side of the exhaust gas flow, while the granulated materials of the $Ba_3Y_4O_9$ and the $BaLa_2O_4$ having a transition temperature are disposed in cells of said porous members on the downstream side of the exhaust gas flow, wherein the transition temperature of the $Ba_2In_2O_5$ is higher than the transition temperature of the $Ba_3Y_4O_9$ and the $BaLa_2O_4$.

6. An exhaust gas purifier as claimed in claim 1, wherein said filter members are constituted of hollow bodies having a bellow inner surface; wherein said electric wire nets are disposed along filter surfaces on inner sides of said hollow bodies, on outer sides of which said porous members are disposed; and wherein exhaust gas is flowed from the inner sides of said filter members to the outer sides thereof.

7. An exhaust gas purifier as claimed in claim 6, wherein outer shapes of said hollow bodies of said filter members are formed such that the cross sections thereof are in a cylindrical or square form, while shapes of said porous members are formed such that the cross sections thereof are in a cylindrical or square form corresponding to the outer shapes of said hollow bodies.

* * * * *